(12) United States Patent
Reek et al.

(10) Patent No.: US 11,854,314 B2
(45) Date of Patent: Dec. 26, 2023

(54) METHOD FOR CONTROLLING AND/OR DOCUMENTING A WORKING PROCESS OF A SELF-PROPELLED AGRICULTURAL WORKING MACHINE

(71) Applicant: Deere & Company, Moline, IL (US)

(72) Inventors: Edgar Reek, Rockenhausen (DE); Alexander Lohaus, Glan-Münchweiler (DE); Michaela Meyer, Frankenthal (DE)

(73) Assignee: DEERE & COMPANY, Moline, IL (US)

( * ) Notice: Subject to any disclaimer, the term of this patent is extended or adjusted under 35 U.S.C. 154(b) by 221 days.

(21) Appl. No.: 17/249,444

(22) Filed: Mar. 2, 2021

(65) Prior Publication Data

US 2021/0272390 A1    Sep. 2, 2021

(30) Foreign Application Priority Data

Mar. 2, 2020   (EP) .................................... 20020091

(51) Int. Cl.
*G07C 5/02* (2006.01)
*G07C 5/00* (2006.01)
(Continued)

(52) U.S. Cl.
CPC ............... *G07C 5/02* (2013.01); *G07C 5/008* (2013.01); *G07C 5/0841* (2013.01);
(Continued)

(58) Field of Classification Search
CPC ......... G07C 5/02; G07C 5/008; G07C 5/0841
See application file for complete search history.

(56) References Cited

U.S. PATENT DOCUMENTS

2017/0339822 A1*  11/2017  Gresch .................. B62D 6/002
2018/0211450 A1*   7/2018  Gresch .................. G07C 5/008

FOREIGN PATENT DOCUMENTS

DE          1215419 B      4/1966
DE       19804740 A1       8/1999
(Continued)

OTHER PUBLICATIONS

Implement messages application layer, dated May 1, 2009, pp. 1-156.

*Primary Examiner* — Abdhesh K Jha
*Assistant Examiner* — Jonathan E Reinert
(74) *Attorney, Agent, or Firm* — HANLEY, FLIGHT & ZIMMERMAN, LLC

(57) ABSTRACT

A method for controlling and documenting a working operation of an agricultural working machine with an device, the method comprising: providing a first device data for identification of the design of the device; collecting second device data relating to the operation of the device; determining one or more physical dimensions of the device using the second device data obtained during operation of the device; storing first device data together with the physical dimensions in a database; retrieving from the database the physical dimension for the device with the agricultural working machine based on the first device data; and controlling a working process of the agricultural working machine based on the retrieved physical dimensions of the device.

16 Claims, 2 Drawing Sheets

Figure 1:
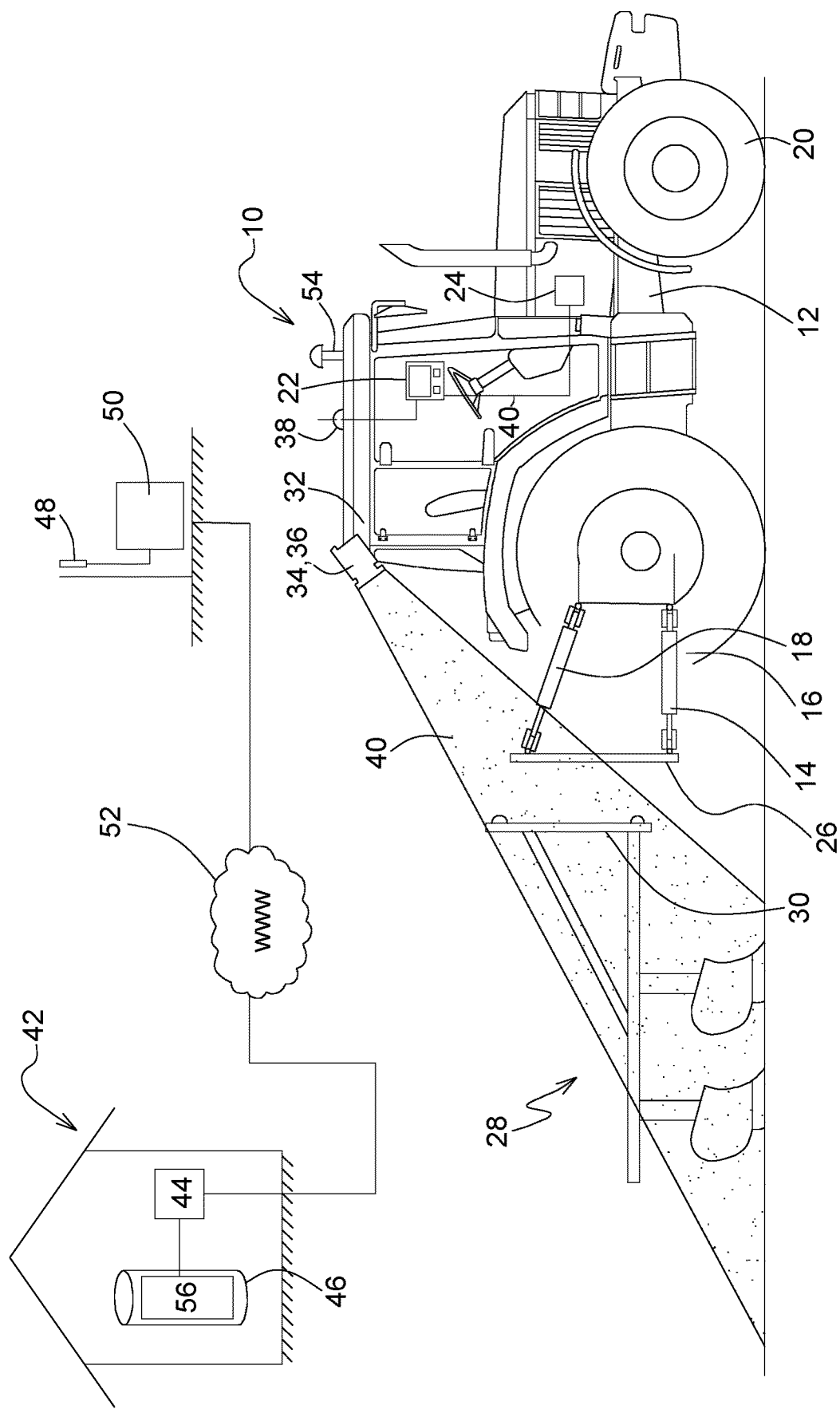

(51) Int. Cl.
*G07C 5/08* (2006.01)
*A01D 41/127* (2006.01)
*A01C 7/06* (2006.01)
*A01D 41/02* (2006.01)
*A01B 69/00* (2006.01)
*A01B 69/04* (2006.01)

(52) U.S. Cl.
CPC ............ *A01B 69/001* (2013.01); *A01B 69/008* (2013.01); *A01C 7/06* (2013.01); *A01D 41/02* (2013.01); *A01D 41/127* (2013.01)

(56) References Cited

FOREIGN PATENT DOCUMENTS

| | | |
|---|---|---|
| DE | 102012109210 A1 | 4/2014 |
| DE | 102016209270 A1 | 11/2017 |
| EP | 2804139 A1 | 11/2014 |
| EP | 3243367 A2 | 11/2017 |
| EP | 3243368 A2 | 11/2017 |

\* cited by examiner

METHOD FOR CONTROLLING AND/OR DOCUMENTING A WORKING PROCESS OF A SELF-PROPELLED AGRICULTURAL WORKING MACHINE

RELATED APPLICATIONS

This document claims priority based on European Patent Application No. 20020091.3, filed on Mar. 2, 2020, which is hereby incorporated by reference into this application.

DESCRIPTION

This disclosure relates to a method for controlling and/or documenting a working process of a self-propelled agricultural machine which is interacting with a device.

BACKGROUND

In agriculture, self-propelled tractors are used for various tasks, such as soil cultivation, the application of materials such as seeds or fertilizer to a field, for harvesting or for transport work. According to this, different equipment must be coupled to the tractor, such as ploughs, sowing machines, fertilizer spreaders, balers, mowers, mounted forage harvesters or transport trailers. The tractors are therefore equipped with one or more interfaces to which different devices can be attached. Such interfaces can be a towing coupling for attaching, for example, a transport trailer or a baling press, a rear power lifter (usually a three-point coupling) at the back of the tractor and/or a front power lifter (usually a three-point coupling) at the front of the tractor, each of which is used for the attachment of devices not coupled with a drawbar, for example mowers, field sprayers, forage harvesters, fertilizer spreaders, sowing machines or ploughs. In addition to tractors, other types of self-propelled working vehicles are also used in agriculture, such as self-propelled harvesters (for example combine harvesters or forage harvesters) or vehicles for moving loads (for example wheel loaders or telehandlers).

For the electronic documentation of a self-propelled working machine, which may be a tractor or a harvester or any other vehicle to which different equipment for carrying out agricultural operations can be attached, as stated above, and work carried out by a device that is coupled to the working machine in any way, which may be used, inter alia, for billing or verification purposes, certain physical dimensions of the apparatus will be required. Analogously, such dimensions of the device are also required in the event that automatic control of actuators of the working machine and/or the device is to be carried out. These physical dimensions can be, for example, the working width of the device or the distance from a reference point of the device of an interface of the working machine. The reference point can, for example, define the location of a virtual pivot point of the device needed for automatic steering of the device, or the location of working tools of the device, which are used, for example, for soil cultivation or material application (for example, seed and/or fertilizer in the case of a sowing machine).

SUMMARY

A method for controlling and documenting a working operation of an agricultural working machine with a device, the method comprising: providing data for identification of the design of the device; collecting data relating to the manual operation of the device; determining one or more physical dimensions of the device on the basis of the data obtained during manual operation of the device; storing data for identification of the design of the device together with the physical dimensions in a database; retrieving from the database the physical dimension for the device with the agricultural working machine based on an identified design of the device; and controlling a working process of the agricultural working machine based on the retrieved physical dimensions of the device.

A method for controlling and documenting a working operation of an agricultural working machine with a device, the method comprising: providing a first device data for identification of the design of the device; collecting second device data relating to the operation of the device; determining one or more physical dimensions of the device using the second device data obtained during operation of the device; storing first device data together with the physical dimensions in a database; retrieving from the database the physical dimension for the device with the agricultural working machine based on the first device data; and controlling a working process of the agricultural working machine based on the retrieved physical dimensions of the device.

DRAWINGS

Figure 2:
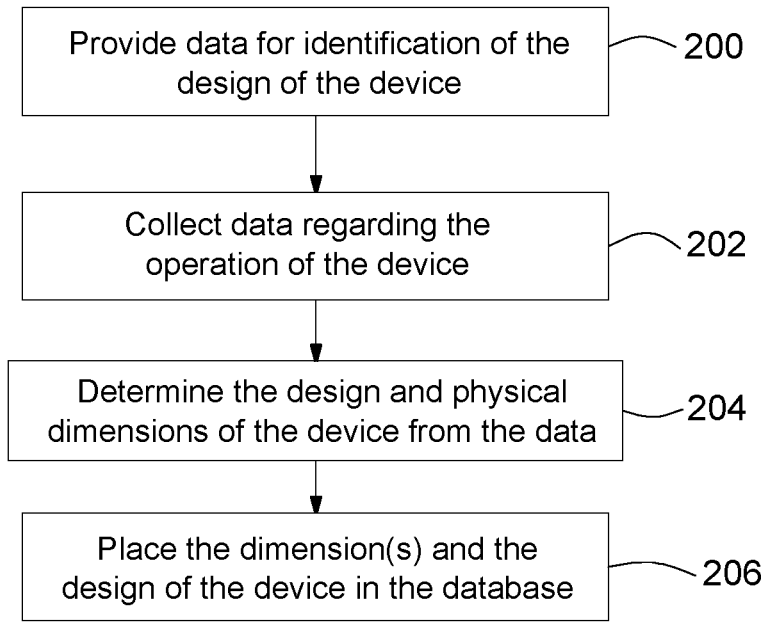
Figure 3:
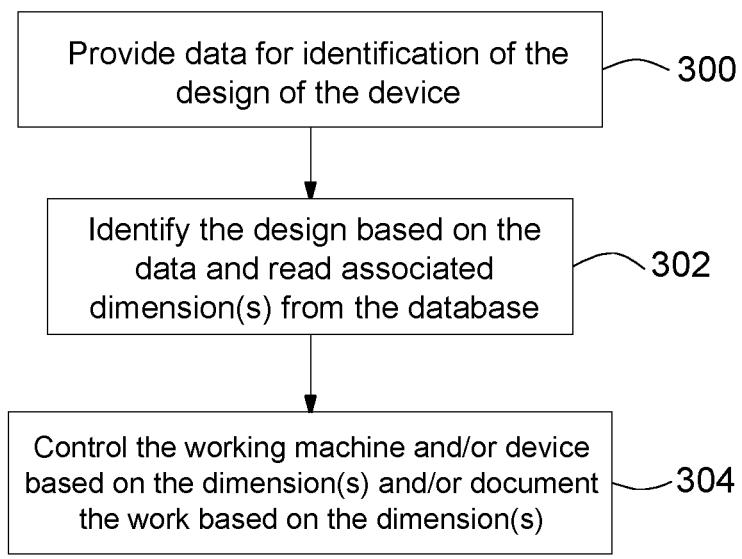

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 1: shows a lateral view of a self-propelled agricultural machine with a height-adjustable interface and a device attached to it, as well as a telecommunications device that communicates with a database;

FIG. 2 shows a flow chart according to which one or more physical dimensions of the device are determined; and FIG. 3 shows a flowchart according to which, on the basis of the determined physical dimensions, the working machine and/or the device is/are controlled, or documentation of the work carried out is performed.

DETAILED DESCRIPTION

In one example, the agricultural working machine is in particular a tractor which has a position-changing (three-point) interface in the form of a front and/or rear power lifter for the attachment of any device. However, it may also be a self-propelled harvester in the form of a combine harvester or forage harvester, which comprises a position-changing interface in the form of an inclined conveyor or feed channel to which a device in the form of a harvesting attachment can be attached.

A method of controlling and/or documenting a working operation of the agricultural working machine which is interacting with a device includes the following steps: (a) providing data for identification of the design of a device which is being used or which is to be used with the working machine; (b) collecting data relating to the operation of the device (e.g., manual or automated operation); (c) determining one or more physical dimensions of the device on the basis of the data obtained during the operation of the device; (d) storing data for identification of the design of the device together with the physical dimensions in a database; (e) retrieving from the database the physical dimensions for a device which is being used or which is to be used with a working machine based on an identified design of the device; and (f) checking and/or documenting a working operation of the working machine based on the retrieved physical dimension(s) of the device.

In other words, in steps (a) to (d) a database is built which stores physical dimensions associated with a device design. For example, during an initial manually controlled operation of the working machine with the device, data are first collected together with data that enable identification of the design of the device. On the basis of the data, the database is loaded with data for the identification of the design of the device on the one hand and with the physical dimensions of the respective device on the other hand, which are derived from the data obtained during the manually controlled operation of the device.

Thus, the database is available after steps (a) to (d). If the working machine in step (e) is now coupled to any device, the design of the device can be identified first and then the physical dimensions can be read out from the database based on the design. These dimensions are used in step (f) in a known manner to control and/or document the operation of the working machine and/or the device.

In this way, not only is the control of the working machine carried out in an automated way, but also the creation of the database, which reduces the effort required to create the database. In addition, the database is not based on data regarding individual devices, but on their design, which significantly reduces the size of the database.

Preferably, steps (a) to (d) are performed for devices of different designs. In the step (e) the design of the device is preferably determined on the basis of data for the identification of the respective device. The data for the identification of the device which is being used or which is to be used with the working machine for steps (a) and (e) may be provided by a camera. The database can be kept at a place remote from the working machine and may communicate with a wireless communication unit of the working machine. The steps (c), (d) and (e) can be at least partially performed on a server connected to the database.

The identification of the device and its physical dimensions may be carried using a bus system operating in particular under the ISO 11783 standard, in particular part 7 of the standard. For this purpose, the device must be equipped with its own control unit, which cooperates with the control unit of the working machine. It has also been proposed that devices that are not equipped with a control unit be provided with a memory so that the device can be identified by the bus in relation to the working machine (German Patent Appl. No. DE 198 04 740 A1).

In practice, however, not all devices are equipped with a control unit or memory that allows the device and its physical dimensions to be identified in relation to the working machine. It has therefore been proposed that agricultural attachments should be identified by a camera and image processing software on the basis of the actual device (German Patent Appl. No. DE 10 2016 209 270 A1) or an identification panel attached to it (German Patent Appl. No. DE 10 2012 109 210 A1), on which machine-readable information is attached for identifying the attachment device, in order to extract data from a local or distant database with regard to the physical dimensions of the device and to carry out automatic adjustments of the working machine on the basis of the data. However, this approach still requires that a database be created for each device. However, since the control software runs on the working machine, every manufacturer of working machines would have to create a database for each device ever available on the market. If there are certain manufacturers of working machines and equipment, then databases each with equipment data sets would ultimately be required, which means an effort that cannot be realized in practice.

European Patent Appl. No. EP 2 804 139 A1 proposes the creation of a central database in which operators of working machines on a field create and store so-called headland turn sequences and upload the stored sequences to a central server from which other operators can download the sequences again. The selection of a sequence to be downloaded is based on an identification of the respective device, an adjustment parameter of the working device and, if necessary, on the basis of environmental properties and achieved result values. Here, the creation of a database is moved from the manufacturer to the customer, which reduces the effort required to create the database for the manufacturer. However, the disadvantage remains that for each combination of equipment and machines only complete sequences are stored and retrieved, so that separate sequences have to be created and kept available for each combination of working machine and device, which implies the disadvantage that the sequence databases will be very large on the one hand and hardly complete on the other hand.

FIG. 1 shows a lateral view of a self-propelled working machine 10 in the form of a tractor. The working machine 10 comprises a load-bearing frame 12, which is supported on the ground by steerable front wheels 20 and drivable rear wheels 16. An interface 26 is attached to the back of the working machine 10 for the detachable attachment of a replaceable device 28, which is implemented here as a tillage implement (plough). The device 28 is equipped with a complementary interface 30. The interfaces 26, 30 can be arbitrary interfaces for agricultural equipment, such as the usual coupling points for connecting a three-point coupling with the working device or a coupling device according to German Patent Appl. No. DE 1 215 419 A. The interface 26 mounted on the working machine 10 is implemented here as a three-point coupling and comprises two length-adjustable lower links 14 and a length-adjustable upper link 18.

The working machine 10 is equipped with a bus system 40, to which, among other things, are connected a control device 24 for controlling various working parameters of the working machine 10, a virtual terminal 22 and a communication unit 38. The bus system 40 can operate, for example, according to ISO 11783 and the control device 24 can control the drive motor, the steering of the front wheels 20, the actuators for adjusting the length of the lower link 14 and the upper link 16 and hydraulic connections for supplying the device 28, insofar as it is equipped with this. The manner of operation of the bus system 40 and the working parameters of the working machine 10 and possibly the device 28 can be found, for example, in Part 7 of ISO 11783.

A camera 34 arranged at the rear end of the roof 32 of a cabin of the working machine 10 has a rear-facing field of view 40, in which the device 28 to be coupled or already coupled is also located. The camera 34 generates an image signal, which is processed by an image processing device 36, which can be located in the housing of the camera 34 or at a distance therefrom and which is connected via the bus 40 or a separate line to the control unit 24 and/or the virtual terminal 22. A positioning device 54 for receiving signals of a global satellite navigation system is mounted on the roof 32 of the cabin and connected via the bus 40 or a separate line to the control unit 24 and/or the virtual terminal 22.

The virtual terminal 22 serves as an operator interface and is equipped with a display device and input device (e.g., buttons) and is used by the operator for control and, if necessary, input or correction of working parameters of the working machine 10 and, if necessary, the device 28. The virtual terminal 22 can communicate via the communication unit 38 with a remote location 42, at which a server 44 with a database 46, housing device data 56, is located, using any protocol (for example a cellular protocol of any generation or a WLAN protocol). The communication takes place in a known manner via a mobile or stationary antenna 48, which is connected to a likewise mobile or stationary communication station 50, which in turn establishes an electronic connection 52 to the server 44, for example by using an Internet protocol, be it wireless or via stationary (for example optical) line and intermediate switching points.

During automatic control of the working machine 10 and possibly the device 28, the control unit 24 requires data regarding certain physical dimensions of the device 28, for example its working width and the distance between working elements of the device 28 and the device interface or working machine interface 30 or 26 in the forward direction. These dimensions are needed, for example, to steer the working machine 10 automatically over a field, without excessive position errors or overlapping of the surfaces processed with the device 28, and to raise the device 28 at the appropriate point when reaching a headland turn and to lower it back into the part of the field to be processed when re-entering from the headland.

The present disclosure makes it possible by using certain types (e.g., a priori, previously known or as collected) of device data to determine these dimensions automatically without storing them in advance. For this purpose, the procedure according to FIG. 2 is followed, in the step 200 of which device data are first collected or provided which make it possible to identify the design of the respective devices 28 which is coupled, or which is to be coupled to the working machine 10. Here, the image signals supplied by the camera 34 can be used, which are processed by the image processing device 36. For example, a photo of the device 28 can be taken and the corresponding image data can be saved.

In step 202, device data are then collected regarding the operation of the device 28. This may include at least in part positional data provided by the positioning system 54 and/or image data from the camera 34, which can be at least pre-processed by the image processing system 36. In step 202, these device data are initially only collected.

In step 204, these physical dimensions of the device 28 are calculated automatically. For example, the working width of the device 28 can be determined relatively easily based on the distance travelled (recorded with the position determination system 54) during processing of a field manually operated by a driver. Similarly, the distance between the interface 30 and the active elements of the device 28 can be determined on the basis of the positions (recorded with the position determination system 54) during lifting and lowering in the headland (and, if applicable, the position of the headland which is initially driven on). Analogously, the distance between the interface 30 and the active elements of the device 28 can be determined based on the image signals of the camera 34.

In step 206, the determined dimensions of the device 28 and device data enabling an identification of the design of the respective device 28 are stored in the database 46. The calculation of the physical dimensions of the device can be carried out on board the working machine 10 by the virtual terminal 22 or the control unit 24 or a separate computer (not shown) or carried out by the server 44 after transmission of the raw data determined in step 202. Similarly, the device data which enables the identification of the design of the device can be evaluated on board the working machine 10 by the virtual terminal 22 or the control unit 24 or a separate computer (not shown), or they are evaluated by the server 44 after transmission of the raw data determined in step 202.

Specific features are extracted from the image, which later allows unique identification of the design of the device 28. Thus, in the example of FIG. 1, it can be recognized that it is a plough of a certain series of a particular manufacturer.

After step 206, device data 56 are thus available in the database 46 which make it possible to uniquely identify the device 28, wherein it is not the individual device, but its design which becomes identifiable (which may be defined for example by the manufacturer and the series of the device, for example a plough of the class X of the manufacturer Y), and related physical data of the device. Database 46 is gradually supplemented by data relating to devices of other designs, so that after some time sufficient coverage of the devices on the market in the database is achieved.

To adjust a device 28 which has data already included in the database 46, the flow chart shown in FIG. 3 is used. In step 300, as in step 200, device data are collected or provided, which make it possible to identify the design of the respective device 28 which is coupled, or which is to be coupled to the working machine 10. Here, the image signals supplied by the camera 34 can be used, which are processed by the image processing device 36. For example, it can simply be taking a photo of the device 28 and saving the associated data.

In the step 300 following step 302 certain features are extracted from the image analogously to step 204 on the basis of the data collected in step 300, by which unique identification of the design of the device 28 becomes possible. Analogous to step 206, it is not the individual device which is determined on the basis of the data, but its design (which may be defined by the manufacturer and the series of the device, for example a plough of the series X of the manufacturer Y). In addition, the physical dimensions associated with the design of the identified device 28, which are stored in the database 46, are retrieved from the latter.

If the design of the respective device 28 is not (yet) included in the database 46, an error message can be sent to the operator of the working machine 10 via the virtual terminal 22. He would then have to perform the steps of FIG. 2 in order to add the device 28 which is still missing in the database 46, or—for example if he does not have permission to do so—to control the working machine 10 with the device 28 purely manually.

In addition, the operator can be shown via the virtual terminal 22 which device 28 has been identified. If necessary, the operator can make a correction using the virtual terminal 22, which can also be returned to the database 46, so that it can correct or improve the algorithm for the detection of the respective device 28 if necessary.

In step 304, automatic control of the device 28 and/or the working machine 10 and/or documentation of the work of the device 10 and/or the working machine 10 is/are finally carried out in a known manner based on the dimensions retrieved in step 302. Here, reference can be made to known methods in order to optimize the operation of the device 28 and/or the working machine 10, for example reference may be made to the disclosures of European Patent Appl. Nos. EP 3 243 367 A1 and EP 3 243 368 A1 and ISO 11783 (all parts).

Analogously to step 204, the identification of the design of the respective device 28 by the virtual terminal 22 or the control unit 24 or a separate computer (not shown) can be carried out in step 302, or it is carried out by the server 44 after transmission of the data determined in step 300 to the server 44. The physical dimensions are then retrieved by the server 44 on the basis of the design of the device 28 determined by it or on board the working machine 10.

As a result, with the present procedure physical dimensions of different devices together with data enabling the identification of the design of the respective device 28 are collected in the database 46 and then retrieved from it again. The physical dimensions are generated using operating data collected during operation of the device 28 under manual control. Thus, apart from the initial manual control of the device 28, no further input is required by the driver, so that the effort to create the database 46 is kept within reasonable limits and then automatic control and/or documentation is possible.

It should be noted that various modifications of the described procedure could be conceivable. Thus, the camera 34 can be replaced by a handheld device (smartphone or tablet), which could also take over the function of the virtual terminal 22 and the control device 24 as well as the positioning device 54 and the communication unit 38. The adjustment of the working machine 10 and/or the device 28 can then be done by the operator, who receives appropriate instructions via the handheld device.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency trade-offs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element(s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

Example 1 is a method for controlling and documenting a working operation of an agricultural working machine with a device, the method comprising:
 providing data for identification of the design of the device;
 collecting data relating to the manual operation of the device;
 determining one or more physical dimensions of the device on the basis of the data obtained during manual operation of the device;
 storing data for identification of the design of the device together with the physical dimensions in a database;
 retrieving from the database the physical dimension for the device with the agricultural working machine based on an identified design of the device; and
 controlling a working process of the agricultural working machine based on the retrieved physical dimensions of the device.

Example 2 is the system for evaluating agricultural material of any or all previous examples and further comprising wherein a plurality of devices are used with the agricultural working machine, each device having a different respective device data.

Example 3 is the system for evaluating agricultural material of any or all previous examples and further comprising wherein at least part of the respective device data is determined using the identification of the respective device.

Example 4 is the system for evaluating agricultural material of any or all previous examples and further comprising wherein the respective device data for the identification of the device being used with the agricultural working machine are provided by a camera.

Example 5 is the system for evaluating agricultural material of any or all previous examples and further comprising wherein the database is remote from the agricultural working machine, the database communicating with a wireless communication unit of the working machine.

Example 6 is the system for evaluating agricultural material of any or all previous examples and further comprising wherein the database is connected to a server, the steps of storing data for identification of the design of the device together with the physical dimensions in a database and retrieving from the database the physical dimension for the device with the agricultural working machine based on an identified design of the device occurring on the server.

Example 7 is a method for controlling and documenting a working operation of an agricultural working machine with a device, the method comprising:
 providing a first device data for identification of the design of the device;
 collecting second device data relating to the operation of the device;
 determining one or more physical dimensions of the device using the second device data obtained during operation of the device;
 storing first device data together with the physical dimensions in a database;
 retrieving from the database the physical dimension for the device with the agricultural working machine based on the first device data; and
 controlling a working process of the agricultural working machine based on the retrieved physical dimensions of the device.

Example 8 is the system for evaluating agricultural material of any or all previous examples and further comprising wherein a plurality of devices are used with the agricultural working machine, each device having a different respective device data.

Example 9 is the system for evaluating agricultural material of any or all previous examples and further comprising wherein at least part of the respective device data is determined using the identification of the respective device.

Example 10 is the system for evaluating agricultural material of any or all previous examples and further comprising wherein the respective device data for the identification of the device being used with the agricultural working machine are provided by a camera.

Example 11 is the system for evaluating agricultural material of any or all previous examples and further comprising wherein the database is remote from the agricultural working machine, the database communicating with a wireless communication unit of the working machine.

The invention claimed is:

1. A method for controlling and documenting an operation of an agricultural working machine coupled to a device, the method comprising:
   obtaining data for identification of a design of the device;
   collecting data during manual operation of the agricultural working machine coupled to the device;
   determining a width of the device based on the data obtained during manual operation of the agricultural working machine coupled to the device;
   storing data for identification of the design of the device together with the width in a database;
   retrieving from the database the width of the device based on an identified design of the device; and
   controlling a working process of the agricultural working machine coupled to the device based on the retrieved width of the device.

2. The method of claim 1, comprising using a plurality of devices with the agricultural working machine.

3. The method of claim 1, comprising determining the width using the identification of the design of the device.

4. The method of claim 1, comprising determining the width for the identification of the design of the device being used with the agricultural working machine by using image data obtained from a camera.

5. The method of claim 1, wherein the database is remote from the agricultural working machine, the database communicating with a wireless communication unit of the agricultural working machine.

6. The method of claim 5, wherein the database is connected to a server, the steps of storing data for identification of the design of the device together with the width in a database and retrieving from the database the width for the device with the agricultural working machine based on the identified design of the device occurring on the server.

7. The method of claim 1, comprising determining an additional physical dimension using the identification of the design of the device.

8. The method of claim 1, comprising determining an additional physical dimension for the identification of the design of the device being used with the agricultural working machine by using image data obtained from a camera.

9. A method for controlling and documenting an operation of an agricultural working machine coupled to a device, the method comprising:
   obtaining a first device data for identification of a design of the device;
   collecting second device data during manual operation of the agricultural working machine coupled to the device;
   determining a width of the device based on the second device data obtained during manual operation of the agricultural working machine coupled to the device;
   storing first device data together with the width in a database remote from the agricultural working machine;
   retrieving from the database the width for the device based on the first device data; and
   controlling a working process of the agricultural working machine coupled to the device based on the retrieved width of the device.

10. The method of claim 9, comprising using a plurality of devices with the agricultural working machine.

11. The method of claim 9, comprising determining the width using the identification of the design of the device.

12. The method of claim 9, comprising determining the width for the identification of the design of the device being used with the agricultural working machine by using image data obtained from a camera.

13. The method of claim 12, wherein the database communicates with a wireless communication unit of the agricultural working machine.

14. The method of claim 13, wherein the database is connected to a server and the steps of storing the first device data together with the width in a database and retrieving from the database the width for the device with the agricultural working machine based on the identified design of the device occur on the server.

15. The method of claim 9, comprising determining an additional physical dimension using the identification of the design of the device.

16. The method of claim 9, comprising determining an additional physical dimension for the identification of the design of the device being used with the agricultural working machine by using image data obtained from a camera.

* * * * *